United States Patent [19]

Stone

[11] Patent Number: 6,072,923
[45] Date of Patent: Jun. 6, 2000

[54] OPTICAL SWITCHING, ROUTING, AND TIME DELAY SYSTEMS USING SWITCHED MIRRORS

[75] Inventor: Thomas W. Stone, Bethlehem, Pa.

[73] Assignee: Wavefront Research, Inc., Bethlehem, Pa.

[21] Appl. No.: 09/102,700

[22] Filed: Jun. 22, 1998

Related U.S. Application Data

[63] Continuation-in-part of application No. 08/734,139, Oct. 21, 1996, Pat. No. 5,771,320, which is a continuation-in-part of application No. 08/640,187, Apr. 30, 1996, Pat. No. 5,692,077, and application No. 08/641,195, Apr. 30, 1996, Pat. No. 5,706,383.

[51] Int. Cl.[7] ........................................ G02B 6/26
[52] U.S. Cl. ............................. 385/16; 359/248
[58] Field of Search .............................. 385/16, 147, 131, 385/132, 18, 19, 20, 24, 25; 372/12; 359/237, 248, 291

[56] References Cited

U.S. PATENT DOCUMENTS

| | | | |
|---|---|---|---|
| 4,013,000 | 3/1977 | Kogelnik | 350/96 |
| 5,009,477 | 4/1991 | Alferness et al. | 350/96 |
| 5,036,042 | 7/1991 | Hed | 359/237 |
| 5,133,027 | 7/1992 | Funazaki et al. | 385/5 |
| 5,172,258 | 12/1992 | Verber | 359/138 |
| 5,255,332 | 10/1993 | Welch et al. | 385/17 |
| 5,491,762 | 2/1996 | Deacon et al. | 385/16 |
| 5,532,855 | 7/1996 | Kato et al. | 359/117 |
| 5,619,365 | 4/1997 | Rhoads et al. | 359/248 |
| 5,627,672 | 5/1997 | Rhoads et al. | 359/248 |
| 5,692,077 | 11/1997 | Stone et al. | 385/16 |
| 5,706,383 | 1/1998 | Malcuit et al. | 385/131 |
| 5,771,320 | 1/1998 | Stone | 385/16 |

OTHER PUBLICATIONS

L. B. Aronson, L. Hesselink, "Analysis And Demonstration Of An Integrated Optical Switch Based On Dynamic Free Carrier Gratings: A Blueprint For A 100 x 100 Element Switch Array," IEEE Journal of Quantum Electronics 30, 2332 (1994).

T. J. Bunning, L. V. Natarajan, V. P. Tondiglia, R. L. Sutherland, D. L. Vezie, and W. W. Adams, "Morphology of Reflection Holograms Formed In Situ Using Polymer–Dispersed Liquid Crystal," Polymer [Polymer Communications] 37, 3147 (1996).

T. J. Cloonan, "Free–Space Optical Implementation of a Feed–Forward Crossbar Network," Applied Optics 29, 2006, see Fig. 10 in particular, (1990).

D. Dolfi, , "Photonics for Phased Array Radars," Proceedings of the SPIE, 2560, 158 (Feb. 1995).

Y–T Huang, "Polarization Selective Volume Holograms," Applied Optics, 33, 2115 (1994).

R. T. Ingwall, and T. Adams, "Hologram:Liquid Crystal Composites," Proceedings of the SPIE 1555, 279–290 (1991).

M. S. Malcuit and T. W. Stone, "Optically Switched Volume Holographic Elements," Optics Letters, 20, 1328 (Jun. 1, 1995)*.

(List continued on next page.)

*Primary Examiner*—Akm E. Ullah
*Attorney, Agent, or Firm*—Perkins, Smith & Cohen, LLP; Jacob N. Erlich, Esq.; Jerry Cohen, Esq.

[57] ABSTRACT

Optical switching, routing, interconnection and time delay systems incorporating switchable mirrors in order to overcome problems associated with sensitivity to wavelength of optical carriers, insertion loss, number of required switching devices and control signals switch isolation, noise and crosstalk suppression, spurious reflections, data skew and compactness that are present in previous optical switching, routing, interconnection and time delay systems.

5 Claims, 7 Drawing Sheets

OTHER PUBLICATIONS

N. A. Riza, "Polarization–Based Fiber–Optic Delay Lines," Proceedings of the SPIE, 2560, 120 (Feb. 1995).

E. Spitz, D. Dolfi, and J–P. Huignard, "Microwave Beam Forming by Optical Delay Switching," Proceedings of the SPIE, 1807, 422 (1992).

T. Stone, M. Malcuit, and J. Kleinfeld, "Switched Grating Devices For Phased Array Applications," Proceedings of the SPIE, 2844, 182 (1996)*.

T. Stone, M. Malcuit, and J. Kleinfeld, and J. Kralik, "Micro–Optic Photonic Time Shifters Based On Switched Gratings," Proceedings of the SPIE, 3160, 17 (1997).

T. Stone, J. Kralik, and M. Malcuit, "Characteristics of Photonic Time Shifters Based On Switched Gratings," Proceedings of the SPIE, 3463, (Jul. 21–22, 1998).

R. L. Sutherland, L. V. Natarajan, V. P. Tondiglia, T. J. Bunning, and W. W. Adams, "Switchable Holograms in New Photopolymer–Liquid Crystal Composite Materials," Proceedings of the SPIE, 2404, 132 (Mar. 1995).

K. Tanaka, K. Kato, M. Date, and S. Sakai, "Optimization of Holographic PDLC for Reflective Color Display Applications," Society of Information Display 1995 Digest, Paper 18.1, 267 (May 1995).

E. N. Touglian and H. Zmuda, "A Photonic Variable RF Delay Line for Phased Array Antennas," Journal of Lightwave Technology, 8, 1824 (1990).

E. N. Toughlian and H. Zmuda, "Variable Time–Delay System for Broadband Phased Array and Other Transversal Filtering Applications," Optical Engineering, 32, 613 (1993).

M. Wickham, L. Dozal, L. Lembo, and J. Brock, "A Fiber–Optic Bragg Grating True–Time Delay Generator for Broadband RF Applications," Proceedings of the SPIE, 2560, 148 (Feb. 1995).

OPTICAL SWITCHING, ROUTING, AND TIME DELAY SYSTEMS USING SWITCHED MIRRORS

CROSS REFERENCE TO RELATED APPLICATIONS

This application is a continuation-in-part of U.S. patent application Ser. No. 08/734,139 filed Oct. 21, 1996 entitled OPTICAL SWITCHING AND ROUTING SYSTEM now U.S. Pat. No. 5,771,320 which in turn is a continuation-in-part of U.S. patent application Ser. No. 08/640,187 filed Apr. 30, 1996 entitled OPTICAL TIME SHIFTER AND ROUTING SYSTEM, now U.S. Pat. No. 5,692,077 issued Nov. 25, 1997 and U.S. patent application Ser. No. 08/641,195 filed Apr. 30, 1996 entitled ACTIVE NOISE SUPPRESSOR FOR MULITICHANNEL OPTICAL SYSTEMS, now U.S. Pat. No. 5,706,383 issued Jan. 6, 1998. All of the above applications being incorporated herein by reference.

STATEMENT OF GOVERNMENT INTEREST

This invention was made with Government support under Contract No. F30602-98-C-0079 awarded by the U.S. Air Force. The Government has certain rights in the invention.

FIELD OF THE INVENTION

The present invention relates generally to optical switching, routing, interconnection, and time delay systems, and, more particularly, to optical switching, routing, interconnection, and time delay systems which incorporate the use of switchable mirrors and crosstalk suppressors.

BACKGROUND OF THE INVENTION

With the advent of substantial new uses for high bandwidth digital and analog electro-optic systems, there exists a greater need to effectively control the route and/or timing of electro-optic or optical signals from among many possible paths. This is especially true in digital computing systems where signals must be routed among processors; in analog systems such as phased array radar where both switching and time delay functions are fundamental; and in the switching of high bandwidth optical carriers in communication systems, However, it should be realized that these are just several of numerous electro-optic systems which require the use of optical switching, routing, interconnection, or time delay devices.

In many current and future systems light beams are modulated in a digital and/or analog fashion and used as "optical carriers" of information. There are many reasons why light beams or optical carriers are preferred in these applications. For example, as the data rate required of such channels increases, the high optical frequencies provide a tremendous improvement in available bandwidth over conventional electrical channels such as formed by wires and coaxial cables. In addition, the energy required to drive and carry high bandwidth signals can be reduced at optical frequencies. Further, optical channels, even those propagating in free space (outside of waveguides such as optical fibers) can be packed closely and even intersect in space with greatly reduced crosstalk between channels. Finally, operations that are difficult to perform directly in the lower (e.g., radio) frequencies, such as time shifting for phased array applications, can often be performed more efficiently and compactly using optical carriers.

A common problem encountered in many applications in which high data rate information is modulated on optical carrier beams is the switching of the optical carriers from among an array of channels. These differing optical channels may represent, for example, routes to different processors, receiver locations, or antenna element modules. One approach to accomplish this switching is to extract the information from the optical carrier, use conventional electronic switches, and then re-modulate the optical carrier in the desired channel. However from noise, space, and cost perspectives it is usually more desirable to directly switch the route of the optical carrier directly from the input channel to the desired channel. The required switching operations are typically either from a single input to among an array of outputs (one-to-n) for from among an array of inputs to an array of outputs (m-to-n).

In addition to the switching and routing function described above, control of the timing of optical signals is also very important in some applications—particularly in conjunction with phased arrays. Phased array systems are generally made up of arrays of many relatively isotropic radiators or emitters that are each driven coherently but with a relative phase (or time) delay among individual elements or among subarrays of elements. Controlling this timing across the array of radiators permits the array to form a beam that is strongly peaked in the far-field. Using this well established technique, the direction of the beam can be steered electronically (much faster than is possible mechanically) by controlling the phase shifts. In such applications it is highly desirable to provide time or phase shifting of signals for each emitter in a fast, accurate, compact, lightweight, inexpensive system while introducing minimal insertion losses and negligible spurious noise and crosstalk signals from scatter, reflections, and imperfect switch purity.

There are many practical barriers to implementing time delay networks directly in the microwave bands including large power splitters, bulky microwave cables or waveguides, high insertion losses, and dispersion. Photonic technologies can be applied to this problem, for example, by converting the microwave signals to modulation on optical carriers, introducing the required delays optically, and then converting back into the microwave regime. This type of translation scheme permits the use of optical devices and techniques in phase shifting that are superior to those operating directly in the microwave regime.

For Example, optical time delay networks can potentially be light weight, compact, and insensitive to electromagnetic crosstalk and interference. They can provide very long delays when required. Further, the dispersion effects are greatly reduced and multiple microwave bands can use the same delay network, Still, the advantages of using optical phase or time shifting must outweigh the overhead associated with converting to and from the optical regime.

Another technological challenge associated with driving phased array antennas arises in systems utilizing large bandwidth signals. When beam forming is accomplished by introducing phase delays (rather than time delays), large bandwidths cause the direction of the beam to detune from its desired direction. Since very large bandwidths are required for identification of targets and tracking, true time delay beam forming networks are also important in high performance phased array systems. In true time delay systems, time delays are introduced which correspond to phase delays larger than 2 pi, and the beam squint problem is reduced or eliminated.

For high performance in future phased array radar systems, it has been shown that time delay networks are needed with true time delay, low insertion loss, low crosstalk among the delay channels, and low spurious signal generation. Recently there has been much attention paid to the application of photonic time delay networks for addressing the phased array beam forming problem. There are many openings for the application of optical approaches in radar systems, and the concept of optical beam forming with time delay networks has been physically demonstrated [W. Ng, A. A. Walston, G. L. Tangonan, J. J. Lee, I. L. Newberg, and N. Bernstein, "The First Demonstration of an optically Steered Microwave Phased Array Antenna Using True-Time-Delay," Journal of Lightwave Technology, 9, 1124 (1991).] The bulk of the optical approaches, however, have been directed at switching and delaying the optical carrier using guided waves such as in optical fibers or planar waveguides. Many of these techniques use combinations of integrated optical switches and guided wave delay lines.

Other approaches for optically introducing time or phase shifts include the use of heterodyning and coherent techniques. Finally, free-space optics have been applied to phased array beam forming. These latter approaches have used segmented mirror spatial light modulators and polarization routing through prisms. However there is still much room for advancement in these approaches, particularly with respect to insertion losses, complexity, crosstalk, switch isolation, and multiple reflection suppression.

It is therefore an object of this invention to provide an optical switching and routing system that can independently route each and every optical carrier from an array in input channels to any of an array of output channels.

It is another object of this invention to provide optical switching, routing, and/or time delay systems that provide for a reduced complexity in terms of number of required optical switching elements and control points than other optical switches.

It is a further object of this invention to provide an optical switching and routing systems that exhibit a uniform delay for all possible switching or routing paths, and therefore introduce no relative skew in the switched signals.

It is a further object of this invention to provide optical switching and routing systems that provide a nearly lossless one-to-one optical interconnection from a set of input channels to a set of output channels.

It is a further object of this invention provide an optical time shifter system which has superior switch isolation, multiple reflection and crosstalk suppression; less complexity; lower insertion loss; and less stringent wavelength tolerances than time shifting systems of the past.

It is a further object of this invention to provide optical switching, routing, and/or time delay systems that incorporate a noise suppressor to enhance channel isolation of the switching system and reduce the level of crosstalk It is still another object of this invention to provide an optical time shifter, switching, and/or routing system which is extremely compact.

It is still another object of this invention to provide optical time shifter, switching, and/or routing systems which provide wavelength insensitive performance.

SUMMARY OF THE INVENTION

The present invention overcomes problems associated with sensitivity to the wavelength of the optical carriers, insertion loss, number of required switching devices and control signals, switch isolation, noise and crosstalk suppression, spurious reflections, data skew, and compactness that are present in other optical switching, routing, interconnection, and time delay systems. The present invention includes devices that use high efficiency switched mirror to form optical switching, interconnection, routing, and time delay networks.

Furthermore, the switched mirrors can function, for example, by diffraction (diffractive mirrors) or reflection (reflective mirrors) and have the benefits of a lack of dispersion, where the steered direction does not strongly depend on wavelength. This added benefit can be an asset in very high bandwidth and wavelength multiplexed systems.

For a better understanding of the present invention, together with other and further objects, reference is made to the following description taken in conjunction with the accompanying drawings, and its scope will be pointed out in the appended claims.

DETAILED DESCRIPTION OF THE PREFERRED EMBODIMENTS

It should be noted that the terms switched mirrors and switchable mirrors are used interchangeably throughout the application.

The switching, routing, and time delay systems of this invention utilize switchable mirrors to steer light from input optical channels to various output spatial locations or output optical channels, or alternatively, from an input channel to among a variety of optical paths with differing path lengths or time delays.

Figure 1:
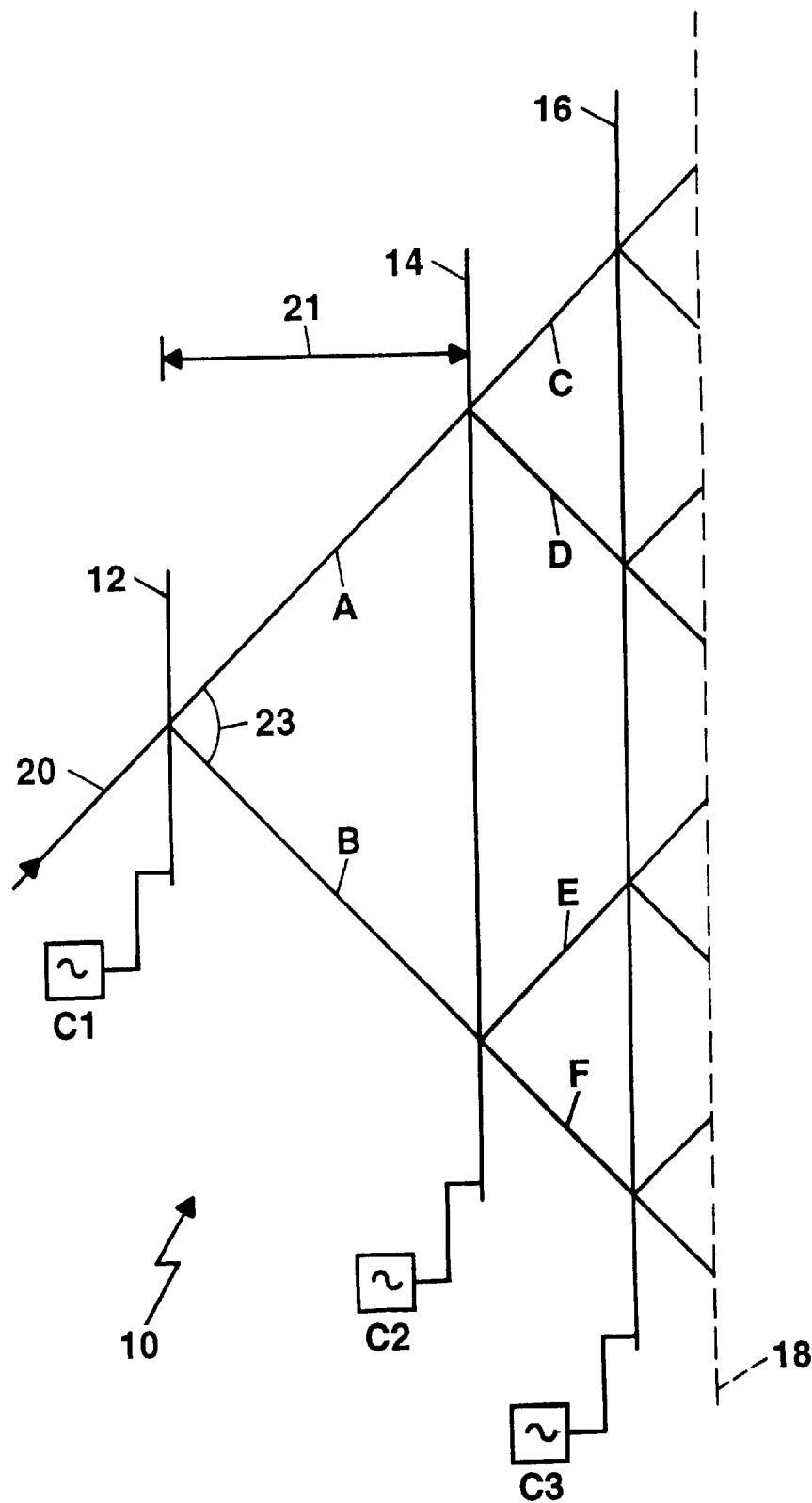
FIG. 1 is a schematic representation of a canonical router system of this invention incorporating electrically switchable mirrors therein.

Reference is now made to FIG. 1 of the drawings which illustrates the broad concept of a fundamental form of the invention in schematic fashion, thereby presenting a building block of the optical time shifter, routing, and switching systems of the present invention in one of numerous embodiments, the other embodiments being set forth below with respect to the remaining Figures.

One embodiment of the subject invention is the routing system 10 illustrated in FIG. 1 of the drawings which depicts a plurality (three being illustrated therein) of switchable mirrors (or switchable mirror arrays, used interchangeably here) 12, 14, 16 which are controlled by any suitable control signals $C_1$–$C_3$ and shown in a cascading fashion. The switchable mirrors (or mirror-arrays) 12, 14, and 16 are shown schematically and some of the possible structures for these mirrors are described hereinbelow. This embodiment enables a beam of electromagnetic radiation, preferably in the form of an optical input carrier 20 to follow 8 possible optical paths leading to 8 differing spatial locations or output channels shown in output plane 18. All of these paths being configured in free-space, without external limitations, although it should be realized the system can be encompassed in a medium of dielectric constant other than unity. In other words, glass or other transparent slabs may be used to seperate the planes of switched mirrors to provide for a monolithic and stable device that is not easily misaligned. Thus, "free space" in the context of this invention describes the use of freely propagating electromagnetic waves in comparison to "guided wave" systems in which the optical carriers are confined to waveguides which are typically of fiber or planar form. In related embodiments of the present invention, each optical path can add a preselected increment in time delay to a transmitted signal.

By selecting one of the 8 combinations of "on or off" states in the mirrors 12, 14, and 16, an input optical carrier signal 20 emanating from any suitable source of electromagnetic radiation (not shown) is reflected (or diffracted as in the caste of a holographic mirror) to follow one of the series of paths as shown in FIG. 1. For example, the beam of electromagnetic radiation (or optical carrier) 20 follows either path A or B after passing through mirror 12 and thereafter after passing through mirror 14 follows preselected paths C, D, E, or F. Thereafter further different optical paths may be followed as illustrated in FIG. 1.

Important parameters of the router shown in FIG. 1 include the stage separation 21 and deviation angle 23. The mirrors, which may take the form of holographic elements described below, have a distinct tradeoff relating to the Bragg regime of their operation. Parameters such as thickness and spatial period must be balanced to assure high diffraction efficiency but also to retain maximal angular and spectral bandwidth tolerances. Finally, the use of microoptics enables very compact routing, switching, and time shifting devices, and requires the balancing of channel density and diffractive crosstalk effects as will be presented out hereinbelow. As the number of stages are increased, their separation increases in multiples so it is usually advantageous to keep spacing small, thus keeping the overall shifter compact.

The switchable mirrors used in the present invention can be made using many technologies, such as volume holographic mirrors, multilayer mirrors, deformable mirrors and micro electromechanical mirrors. But the common feature is that the mirrors exhibit a reflectance that is variable and controllable. When in an "off" state, the mirrors are transparent (or, alternatively, displaced out of the path of the incident beam). When in an "on" state, the mirrors are reflective (or, alternatively, displaced into the path of the incident beam). Many technologies, as described below, also allow for intermediate reflectance values which allow for "fanning-out" the incident signal to among more than one of the delay paths or output channels.

Figure 2:
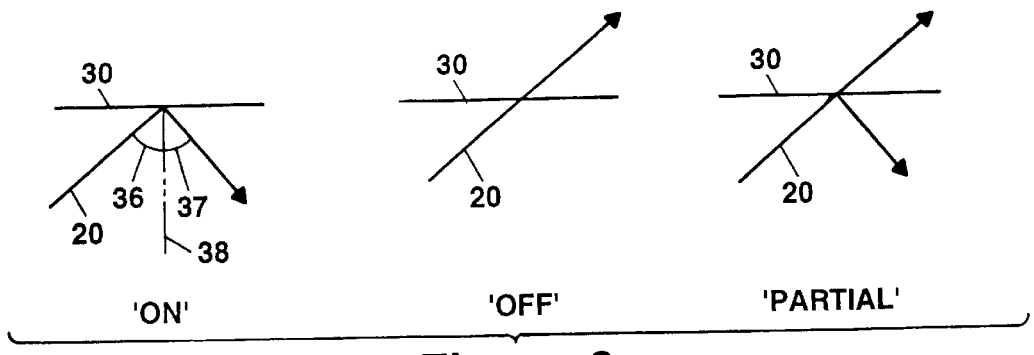
FIG. 2 is a schematic representating of one configuration of switchable mirrors useful in this invention.
Figure 3:
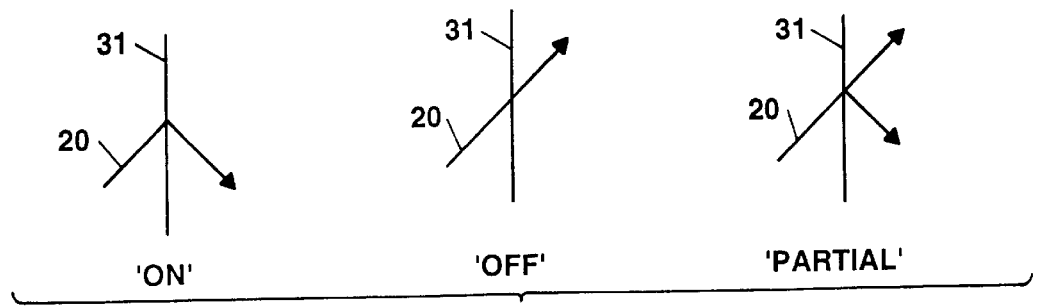
FIG. 3 is a schematic representation of a second configuration of switchable mirrors useful in this invention.
Figure 4:
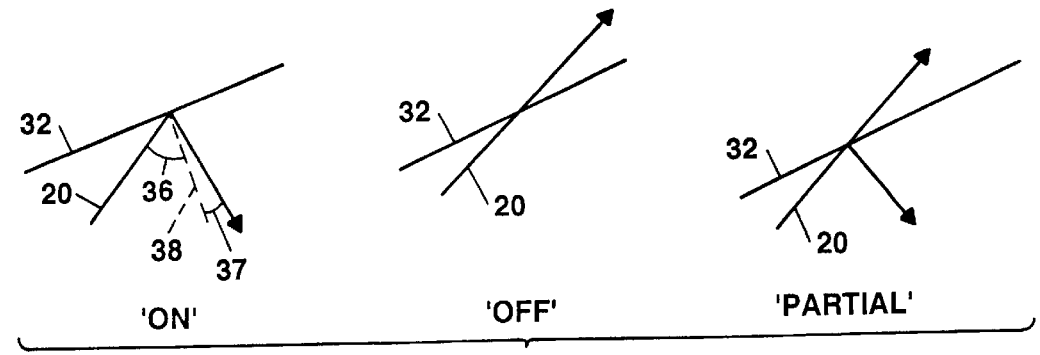
FIG. 4 is a schematic representation of a third configuration of switchable mirrors useful in this invention.

Reference is now made to FIGS. 2–4 of the drawings which illustrate three possible configurations of switchable mirrors. For each of the switchable mirror configurations an optical carrier 20 is incident on the switched mirror structure for the cases of the mirrors off, on, and at an intermediate value of reflectance. In FIG. 2, the optical carrier 20 is incident on switched mirror 30 and is reflected from the mirror that is "on", transmitted through the mirror that is "off", and split into both reflected and transmitted beams by the intermediate state mirror. Switchable mirror 30 is the usual geometry for a mirror, in which incident and reflected waves make equal angles, 36 and 37, with respect to the surface normal, 38.

In FIG. 3 the switchable mirror 31 is shown in a transmission configuration. This reflecting structure can be built, for example, with arrayed conventional switched mirrors, by arrays of deflectable or deformable mirrors, or holographically.

In FIG. 4 the switchable mirror 32 is shown in an asymmetric reflecting configuration, in which incident and reflected waves make unequal angles, 36 and 37, with respect to the surface normal, 38. This reflecting structure can be fabricated, for example, using standard holographic techniques. In such a process, two plane waves incident on opposite sides of the volume recording material, and at asymmetric angles, interfere and produce a spatial refractive index variation throughout the volume of the recording material.

A significant benefit of using the switched mirror elements described here in place of switched transmission gratings is that there is little or no angular dispersion of the optical channel or beam when steered with these mirror elements. Thus multiple wavelengths or broad-spectrum light can be routed, delayed, interconnected, or switched with little or no dispersive angular deviation of the optical carrier.

In one of the preferred embodiments of the invention, volume phase holographic switchable mirrors are used to permit switching of the incident energy between the transmitted and reflected directions. Such switchable mirrors may be controlled by electrical switching, optical switching, and polarization switching of the mirrors, as discussed with specific embodiments of the invention. Recently it has been demonstrated that high efficiency volume diffraction gratings which are recorded in permeable media, such as the DMP-128 photopolymer manufactured by Polaroid Corporation, Cambridge, Mass. can be made to be rapidly switchable between high and low diffraction efficiency states under electric control by imbibing the structure with liquid crystals. In this technique, the crystals are rotated by the applied electric field and their refractive index switches in the range between ordinary and extraordinary values. By choosing the materials so that one of these switchable values of refractive index matches that of the phase modulation in the grating, the grating modulation is effectively switched "off-and-on" as the liquid crystal "fill" material index matches and mis-matches the modulation, respectively.

Most of the optical time shifter and routing systems described herein can utilize electrically switched gratings. In this approach the volume phase diffraction grating, which is typically on the order of tens of microns thick, is bounded by transparent conducting electrodes.

Referring once again to FIG. 1, it should be further understood that although three such gratings are illustrated in the figure, the number of grating can vary in accordance with the utilization of this invention. For example, with the diffraction efficiency of all three gratings off, the shortest, straight through path (that is, following along optical path A, C, etc.) is selected. If the first grating 12 is "on", and all others "off," the top path is selected following optical path B, F, etc. Consequently, by a combination of "on", "off" signals applied to the gratings, it is possible in free space to not only route the optical signal to a desired output area, but also (shown in later time-delay configurations) to do so with a predetermined time delay.

Figure 5:
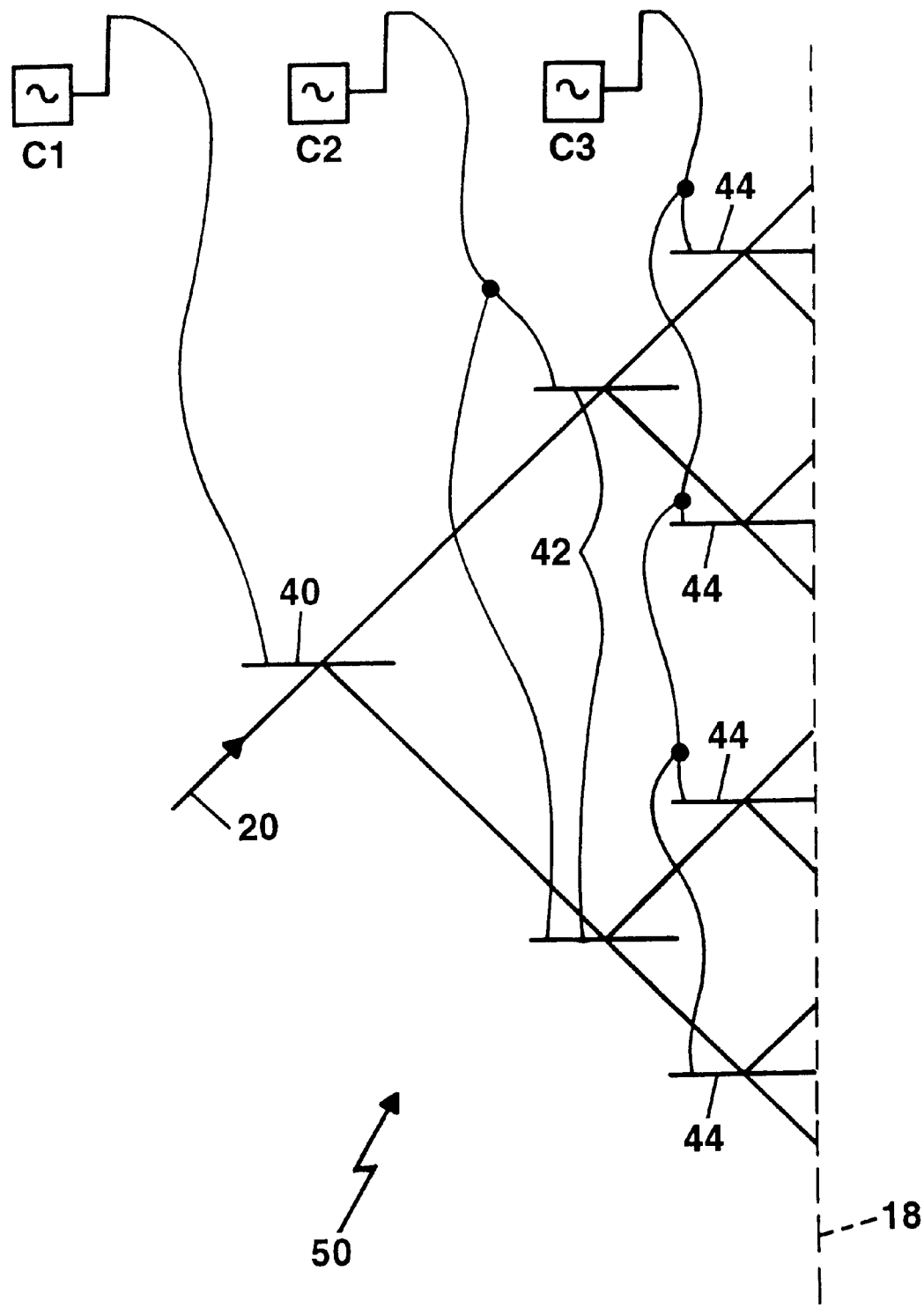
FIG. 5 is a schematic representation of a second canonical router system of this invention incorporating electrically switchable mirrors therein.

Reference is now made to FIG. 5 of the drawings which illustrates another embodiment of the invention in schematic fashion, thereby presenting another building block of the optical time shifter, routing, and switching systems of the present invention.

In this embodiment of the subject invention the routing system 50 illustrated in FIG. 5 of the drawings includes a plurality of switchable mirrors in three groups, 40, 42, 44 which are controlled by any suitable control signals $C_1$–$C_3$ and shown in a cascading fashion. The switchable mirrors 40, 42, and 44 are shown schematically and may consist of volume holographic switchable mirrors. This embodiment enables a beam of electromagnetic radiation, preferably in the form of an optical input carrier 20 to follow 8 possible optical paths leading to 8 differing spatial locations or output channels shown in output plane 18. All of these paths being configured in free-space, without external limitations, although it should be realized the system can be encompassed in a medium of dielectric constant other than unity.

Each of the mirrors grouped at a given cascade depth, e.g., group 40, 42, or 44, may be switched in common.

Accordingly all 4 gratings 44 can be set "on" or "off" with a single control line. In such a fashion n control lines can route a given optical carrier among any of 2**n output channels or different delay paths.

Figure 6:
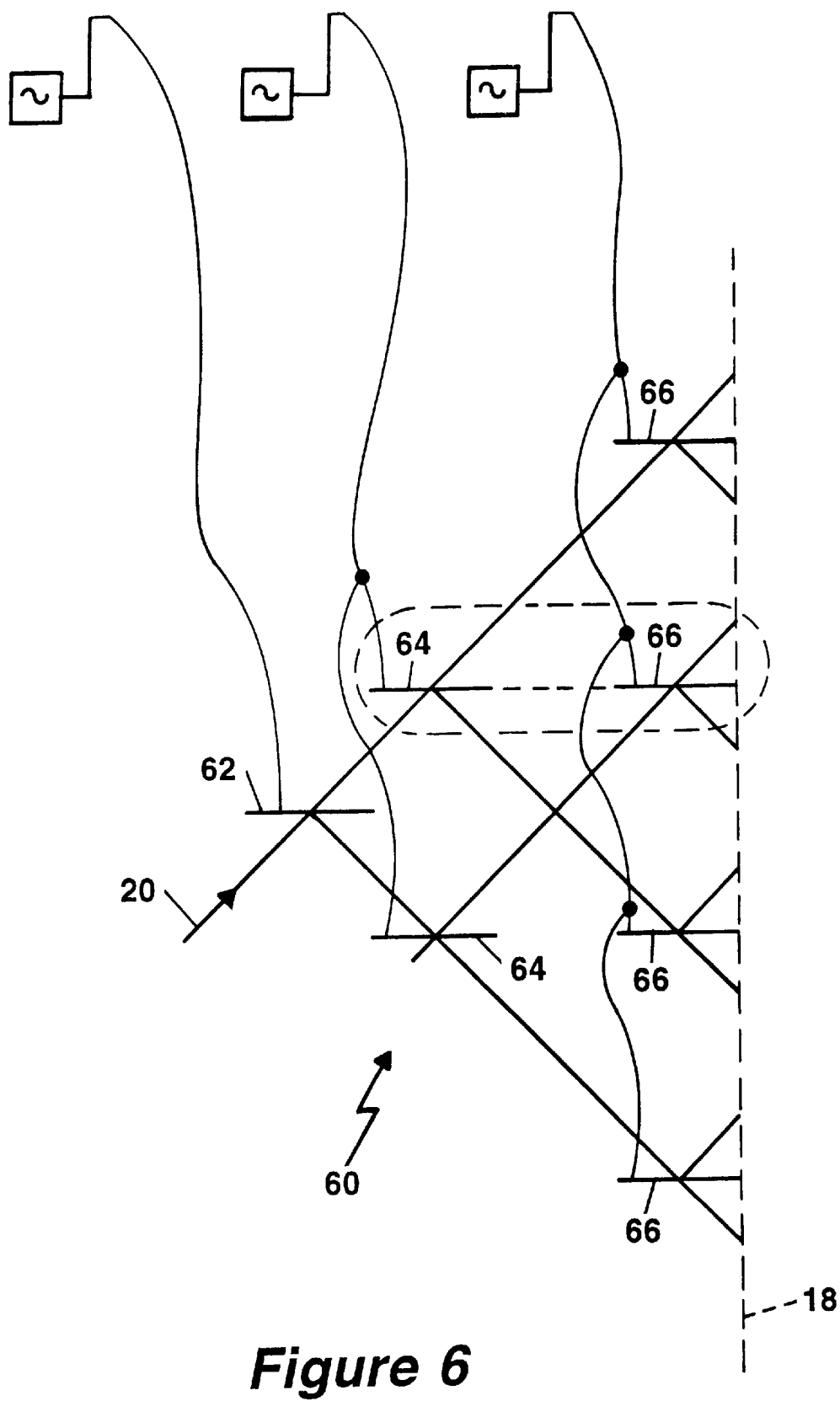
FIG. 6 is a schematic representation of a third canonical router system of this invention incorporating electrically switchable mirrors therein.

Reference is now made to FIG. 6 of the drawings which illustrates another embodiment of the invention in schematic fashion, thereby presenting another building block of the optical time shifter, routing, and switching systems of the present invention.

In this embodiment of the subject invention the routing system 60 illustrated in FIG. 6 of the drawings includes a plurality of switchable mirrors in three groups, 62, 64, 66 which are controlled by any suitable control signals $C_1$–$C_3$ and shown in a cascading fashion. The switchable mirrors 62, 64, 66 are shown schematically aid may consist of volume holographic switchable mirrors. This embodiment enables a beam of electromagnetic radiation, preferably in the form of an optical input carrier 20 to follow 8 possible optical paths leading to 8 differing spatial locations or output channels shown in output plane 18. Here the spacing of the three grating groups or stages 62, 64, 66 has been arranged such that the gratings of group 64 line up with two of the gratings in group 66. This allows for, a practical simplification since a single switched grating with two pixels (shown in the dashed oval) can be located in place of those two grating elements. In such a configuration, one pixel is switched with group 64 and the other with group 66, as shown in FIG. 6.

Using these principles and the switched mirror elements of FIGS. 2, 3, and 4, the canonical switched mirror router shown in FIGS. 1, 5, and 6 can be applied in a straightforward manner to extend the time delay, routing, interconnection, and switching systems of the three cross-referenced applications cited at the beginning of the present application to the use of switched mirror elements. In so doing, the benefits of wavelength insensitivity and lack of angular dispersion can be imparted to these systems. Further, since the discrete selectable paths are isolated as in these earlier systems, the saturable absorber, active, and passive crosstalk or noise suppressors described in these earlier applications also may be incorporated in the switched mirror systems in a straightforward fashion. To this end, the 4 figures of copending U.S. patent application Ser. No. 08/734,139 entitled OPTICAL SWITCHING AND ROUTING SYSTEM filed Oct. 21, 1996 and their descriptions are incorporated herein by reference. Similarly, the 16 figures of U.S. Pat. No. 5,692,077 issued Nov. 27, 199 entitled OPTICAL TIME SHIFTER AND ROUTING SYSTEM and the 5 figures of U.S. Pat. No. 5,706,383 issued Jan. 6, 1998 entitled ACTIVE NOISE SUPPRESSOR FOR MULITICHANNEL OPTICAL SYSTEMS and their respective descriptions are also incorporated herein by reference. In each of the above cases, the switched gratings are replaced in this invention with the switched mirrors to form the systems of the present invention.

Figure 7:
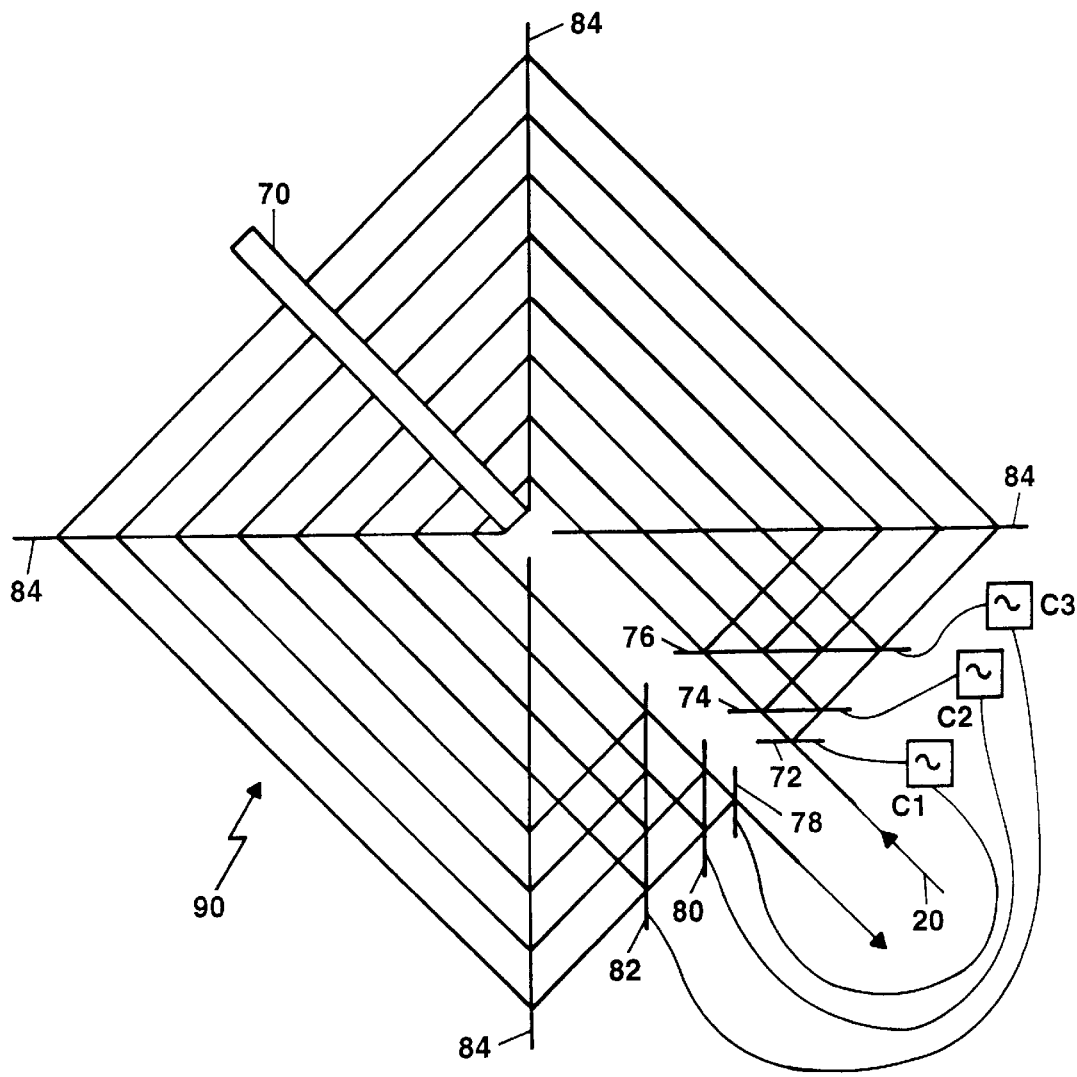
FIG. 7 is a schematic representation of an optical time delay system of this invention incorporating electrically switchable mirrors therein.

An example of this straightforward application of the principles herein is given here in FIG. 7. This time delay system 90 is identical to that of FIG. 15 of U.S. patent application Ser. No. 08/640,187 filed Apr. 30, 1996 entitled OPTICAL TIME SHIFTER AND ROUTING SYSTEM, now U.S. Pat. No. 5,692,077 issued Nov. 2, 1997. However, now switched mirrors 72, 74, 76, 78, 80, 82 are used (of the type in FIGS. 1 and 3)in place of switched gratings. The noise suppressor stage 70 is also directly analogous to that of the earlier patented system. The noise suppressor may consist of a pixellated switchable mirror or grating. In such a case, the desired channel is left to pass, and the grating or mirror pixels in the other (non-selected) channels are set on to deflect the crosstalk signals they contain out of the system. The "steering gratings" of the prior inventions can also be replaced by static mirror arrays, or switched mirrors, 84, which can also be segmented or pixellated and used to add further active crosstalk suppression as described above.

Figure 8:
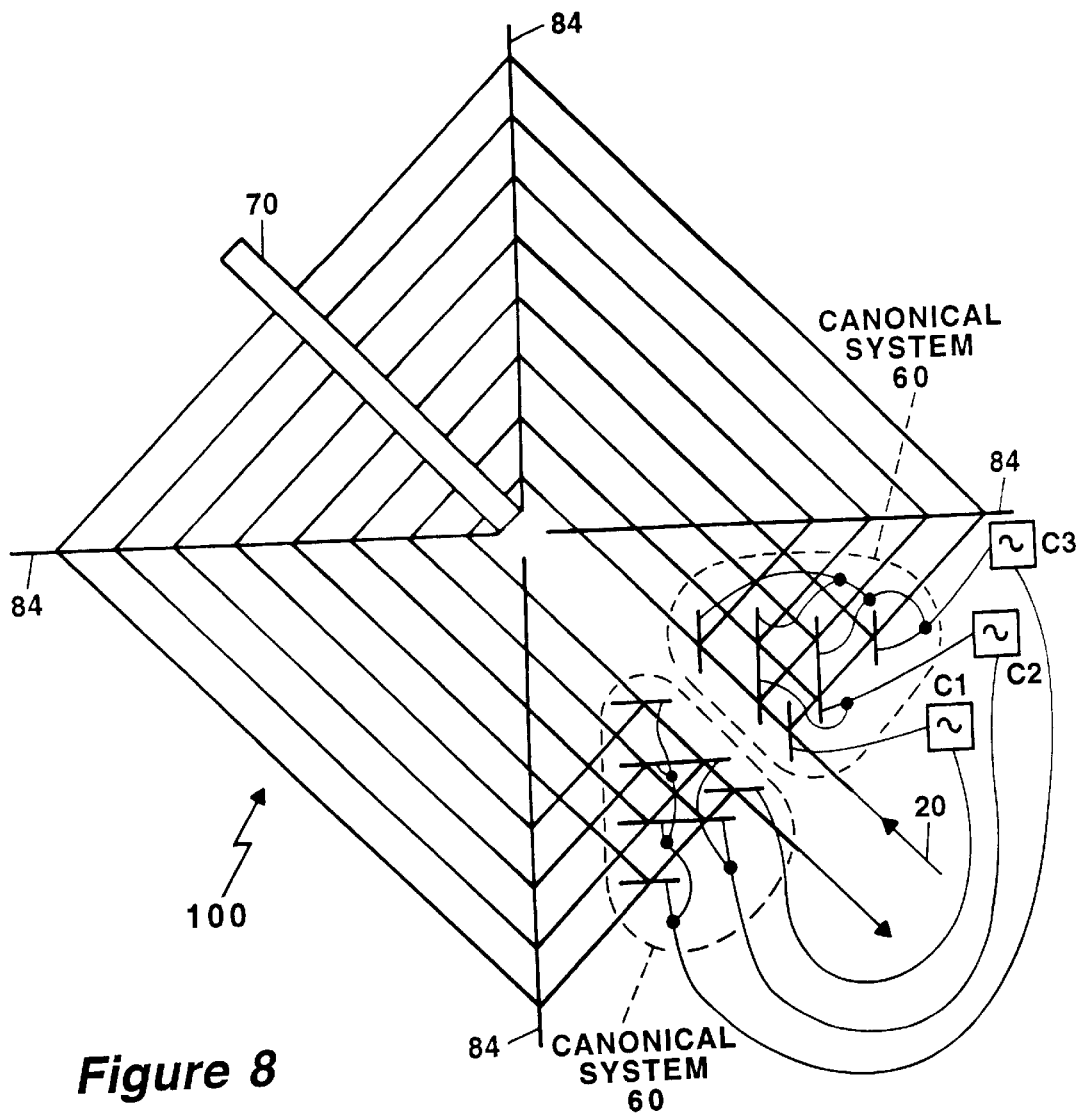
FIG. 8 is a schematic representation of a second optical time delay loop system of this invention incorporating electrically switchable mirrors therein.

In similar fashion, FIG. 8 contains a related system, 100, to that of FIG. 7, but where switched mirrors of the type shown in FIG. 2, and the canonical router of FIGS. 5 or 6 are used. Two of the canonical router systems 60 of FIG. 6 are used in FIG. 8 to effect a switched mirror time delay system.

Figure 9:
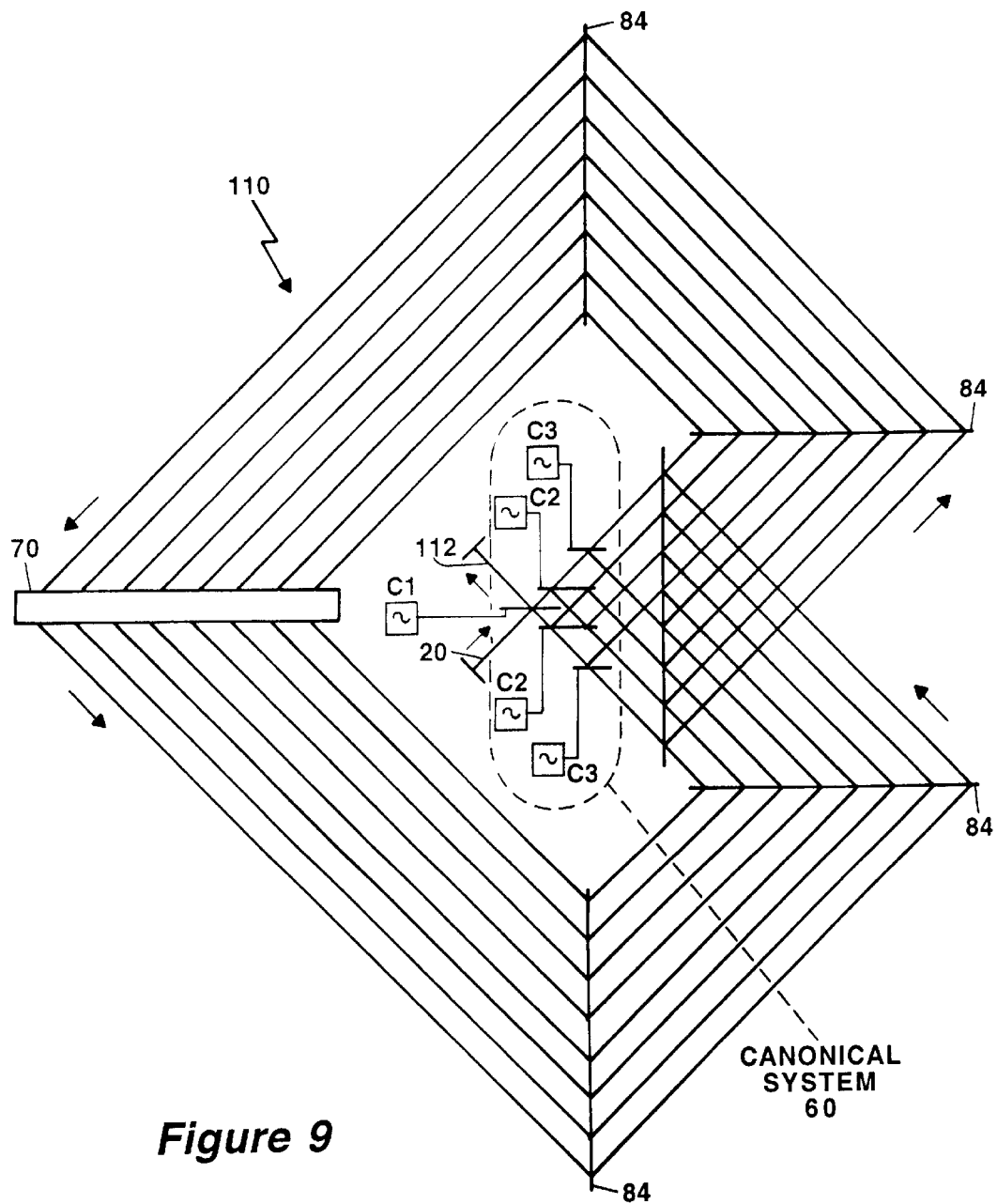
FIG. 9 is a schematic representation of a closed loop optical time delay system of this invention incorporating electrically switchable mirrors therein.

A related "closed loop" time shifter system 110 is illustrated in FIG. 9. Here the same canonical switching system 60 is used in double pass in a closed loop configuration. Setting the n control lines steers the beam through any of the 2**n selectable paths, each with a distinct time delay. The same grating states, on the second pass, steer the optical carrier to the output 112. This configuration is useful with either switched gratings or mirrors.

Although the invention has been described with respect to various embodiments, it should be realized this invention is also capable of a wide variety of further end other embodiments within the spirit and scope of the appended claims, such as for, example, the switched mirror routers of the present invention can be applied to the mxn switching systems of the above-referenced copending U.S. patent application Ser. No. 08/734,139.

What is claimed is:

1. An optical time shifter and routing system comprising:
    a first switchable mirror for receiving a beam of electromagnetic radiation and for selectively directing said beam into at least first and second optical paths;
    a second switchable mirror interposed within said optical paths for receiving said beam of electromagnetic radiation and selectively directing said beam of electromagnetic radiation following said first optical path into at least third and forth optical paths, and for selectively directing said beam of electromagnetic radiation following said second optical path into at least fifth and sixth optical paths;
    each of said optical paths being of a different predetermined length; and means operably associated with said first and second switchable mirrors for controlling the path taken by said beam of electromagnetic radiation.

2. An optical time shifter and routing system as defined in claim 1 further comprising:

means for detecting said beam of electromagnetic radiation after having passed through a predetermined combination of said optical paths; and means optically aligned adjacent said detecting means for directing said beam of electromagnetic radiation after having passed through a predetermined combination of said optical paths to said detecting means.

3. An optical time shifter and routing system as defined in claim 2 further comprising means interposed between said directing means and said detecting means for suppressing unwanted signals resulting from the passage of said beam of electromagnetic radiation through said predetermined combination of said optical paths.

4. An optical switching and routing system comprising:

means for receiving at least one incident signal of electromagnetic radiation, said receiving means including n cascaded switching stages, at least one of said switching stages comprises a switchable mirror, and each of said cascaded switching stages having a predetermined separation therebetween, said predetermined separation between said stages vary from one from another as powers of an integer, said integer being at least 2, said cascaded switching stages directing said at least one incident signal to at least one of in spathal locations, wherein i is an integer, and wherein said incident signals propagate through said stages of said switching and routing system in free space.

5. An optical switching and routing system comprising:

a first router assembly, a second router assembly optically aligned with said first router assembly, and a central plane having an optical redirecting component therein interposed between said first router assembly and second router assembly;

said first router assembly being capable of receiving a plurality of individual beams of electromagnetic radiation and having a predetermined orientation, said first router assembly including means defining a plurality of independently controlled segments for directing said plurality of individual beams of electromagnetic radiation from preselected locations along said segments to preselected locations on said optical redirecting component in said central plane;

said second router assembly being different in orientation from said predetermined orientation of said first router assembly, said second router assembly including means defining a plurality of independently controlled segments for receiving each of said individual beams from said optical redirecting component and directing said individual beams for output from said second router assembly; and at least one of said router assemblies comprising at least one switchable mirror.

* * * * *

UNITED STATES PATENT AND TRADEMARK OFFICE
CERTIFICATE OF CORRECTION

| | | |
|---|---|---|
| PATENT NO. | : 6,072,923 | Page 1 of 1 |
| DATED | : June 6, 2000 | |
| INVENTOR(S) | : Thomas W. Stone | |

It is certified that error appears in the above-identified patent and that said Letters Patent is hereby corrected as shown below:

<u>Column 1,</u>
Line 23, "Contract No. F30602-98-C-0079" should read -- Contract Nos. F30602-95-C-0238, F30602-97-C-0198 and F30602-98-C-0079 --.

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*